United States Patent [19]

Ellmann et al.

[11] Patent Number: 4,725,638

[45] Date of Patent: Feb. 16, 1988

[54] FLAME RETARDANT POLYMER COMPOSITIONS

[75] Inventors: Eva Ellmann; Shaul Yanai, both of Beer-Sheva; Pierre Georlette; Avraham Teurestein, both of Omer, all of Israel

[73] Assignee: Bromine Compounds, Ltd., Beer-Sheva, Israel

[21] Appl. No.: 906,537

[22] Filed: Sep. 12, 1986

[30] Foreign Application Priority Data

Sep. 20, 1985 [IL] Israel ............................... 76434

[51] Int. Cl.$^4$ ............................................... C08K 5/05
[52] U.S. Cl. ..................................... 524/377; 524/411; 524/412
[58] Field of Search ............... 524/377, 380; 521/88; 568/844

[56] References Cited

U.S. PATENT DOCUMENTS

| | | | |
|---|---|---|---|
| 3,607,953 | 9/1971 | Hurley | 568/844 |
| 3,700,625 | 10/1972 | Brady et al. | 524/366 |
| 3,700,957 | 10/1972 | Daniels | 524/380 |
| 3,864,306 | 2/1975 | Dieckmann | 524/288 |
| 3,876,509 | 4/1975 | Davis et al. | 568/844 |
| 3,883,581 | 5/1975 | Davis | 524/314 |
| 3,932,541 | 1/1976 | Davis et al. | 568/844 |
| 3,951,894 | 4/1976 | Whelan | 524/380 |
| 4,001,182 | 1/1977 | Murtha et al. | 524/288 |
| 4,378,440 | 3/1983 | Bertrand | 524/380 |

*Primary Examiner*—Veronica P. Hoke
*Attorney, Agent, or Firm*—Schwartz, Jeffery, Schwaab, Mack, Blumenthal & Evans

[57] ABSTRACT

The present invention relates to flame retardant polymer compositions comprising a flammable polymer and an amount of between 1% to 40% by weight of tetrabromodipentaerythritol as flame retardant agent. Optionally, synergistic flame retardant additives such as antimony oxide are incorporated in the compositions. The flammable polymers are selected from polyolefins, polyamides and styrenic resins or mixtues thereof. The flame retardant agent according to the present invention imparts to the polymer compositions improved thermal aging behaviour, thermal stability and non blooming property, compared with known flame retardant agents.

8 Claims, 1 Drawing Figure

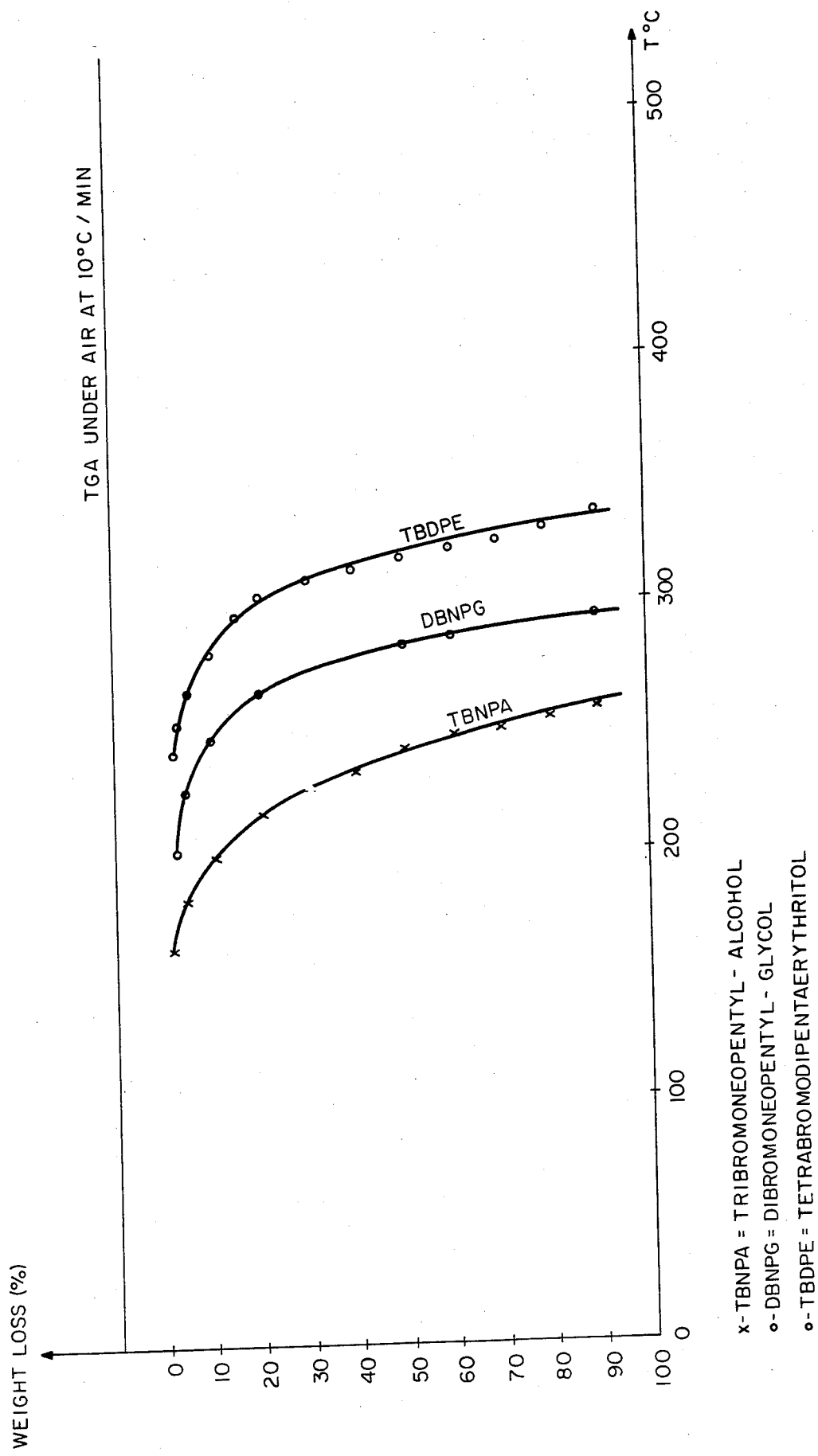

FLAME RETARDANT POLYMER COMPOSITIONS

The present invention relates to flame retardant polymer compositions. More particularly, the invention relates to flame retardant polymer compositions containing a versatile solid flame retardant agent.

BACKGROUND OF THE INVENTION

It is known that halogen-containing compounds are frequently utilized with polymers, the flame retardant property being imparted by the halogen present therein. A large number of different compositions are known for rendering polymers inflammable or self-extinguishing, such compositions being based generally on the use of various halogenated compounds. It is also known that certain bromine compositions are more effective flame retardant agents than the corresponding chlorine compounds.

According to U.S. Pat. No. 3,864,306, there are disclosed blends of polymers with flame retardant agents consisting of esters of brominated dipentaerythritol. These fire retardant agents have a relative low bromine content, in the range of between 37% for the dibenzoate and 53% for the diacetate esters of tetrabromodipentaerythritol. The latter one, has the additional disadvantage of being a viscous liquid which requires special handling in preparing the adequate formulations. As known, compounders of thermoplastics like polyolefins, styrenes etc. prefer handling free flowing powders as additives rather than liquid.

The incorporation of flame retardant can effect in some polymers the light stability particularly where out-door exposure is of concern. It is known that brominated aliphatic neopentylic structures, encounter superior Ultra Violet stability.

Another important property required for flame retardant polymer compositions is the thermal stability. An efficient flame retardant agent should also possess good thermal stability.

SUMMARY OF THE INVENTION

It is an object of the present invention to provide new flame retardant polymer compositions which contain a flame retardant agent with a high bromine content. It is another object of the present invention to provide new flame retardant polymer compositions which contain brominated neopentyl-type bromine agents. It is yet another object of the present invention to provide new flame retardant polymer compositions which contain a flame retardant agent in a free-flowing form. Thus the invention consists of flame retardant polymer compositions comprising a readily flammable polymer selected from the group consisting of polyolefin, polyester, polyamide styrenics or polyurethanes and an amount of between 1% to 40% by weight of tetrabromodipentaerythirtol. It was discovered that tetrabromodipentaerythirtol imparts improved thermal stability to the polymer compositions in comparison with other known flame retardant agents. Also with some polymers, this additive possesses lubricative properties and therefore no additional lubricants, which might detract from the flame retardancy property, are required.

Tetrabromodipentaerythritol (hereinafter referred to as TBDPE) combines two valuable properties: high thermal stability and high bromine content. In the following Table 1, are summarized the thermal gravimetric analyses and bromine contents of this compound as well as two of the esters of TBDPE.

TABLE 1

Thermal gravimetric analyses of TBDPE and some of its esters.

| The compound | TBDPE (1) | Diacetate ester (1) of TBDPE | Dibenzoate ester (2) of TBDPE |
|---|---|---|---|
| % Bromine | 63 | 53 | 37 |
| % weight loss | | | |
| 1 | — | 150 | — |
| 2 | 240 | 175 | 275 |
| 6 | 256 | 200 | 300 |
| 15 | 295 | 226 | — |
| 34 | 312 | 250 | — |

(1) under air, 10 degrees C./min;
(2) under nitrogen, 10 degrees C./min.

As appears from the above Table 1, TBDPE has the highest bromine content, compared with its esters (63% versus 53% and 37% respectively). Compared with the diacetate ester, which has a closer bromine content, it has a much better thermal stability.

According to the present invention it was surprisingly found that TBDPE has an improved effect on the melt flow index of polymers, by reducing its viscosity and thus enabling their easy processability. This is quite unexpected in view of the negative effect, i.e. increase in viscosity, imparted to polymers by well-known flame retardant agents. In the following Table 2, are summarized some comparative results concerning melt flow index and flame retardant property imparted by TBDPE (according to the present invention) and a known flame retardant such as Deca to high-impact polystyrene (HIPS).

TABLE 2

Comparison between viscosities properties of TBDPE and Deca with HIPS (in parts by weight).

| | Experiment Number | | | | |
|---|---|---|---|---|---|
| Compositions | 1 | 2 | 3 | 4 | 5 |
| HIPS | 100 | 100 | 100 | 100 | 100 |
| TBDPE | — | 15 | 24.75 | — | — |
| Deca | — | — | — | 11 | 17.75 |
| Antimony Oxide (AO) | — | 3.15 | 5.20 | 3.04 | 4.91 |
| % Bromine | — | 8 | 12 | 8 | 12 |
| Ratio Br/Sb | — | 3 | 3 | 3 | 3 |
| Properties. | | | | | |
| MFI (g/10 min)* | 4.4 | 7.55 | 11.13 | 6.8 | 3.6 |
| UL 94** | V-B | V-2 | V-O | V-2 | V-O |

*melt flow index measured at 230 degrees centigrade, 1.2 kg according to ASTM-D-1238(70).
**flammability test of Underwritter Laboratories.

As appears from the above Table 2, the melt flow index of HIPS alone is 4.4; by incorporation of 15 parts of TBDPE the MFI increases to 7.5 g/10 min, while by incorporating of 17.74 parts Deca, the MFI decreases to 3.6 g/10 min.

TBDPE can be easily obtained from dipentaerythritol and hydrogen bromide. Hereafter is presented a full description of this preparation being understood that other methods can be envisaged, the Example presented below being considered only a feasible approach.

EXAMPLE 1

Into a 2 liter flask containing 180 g acetic acid, gaseous HBr was bubbled until the temperature of the solution reached 50 degrees centigrade. To this solution, 381 g of dipentaerythritol were introduced at a rate such that the temperature did not exceed 65 degrees centigrade. Then, gaseous HBr was further bubbled with heating until the temperature reached 125 degrees centigrade and no more HBr was consumed. The solution was cooled to 70 degrees C. and was then distilled in vacuum (60 mmHg) until the temperature in the flask increased to 115-120 degrees centigrade. The flask was cooled to 60 degrees centigrade, and 350 ml of methanol was added followed by about 20 g of gaseous HBr. The mixture was heated under reflux for about one hour. Then, vacuum was applied (100 mmHg) and the mixture was distilled under vacuum until the temperature in the flask was about 115-120 degrees centigrade.

The residue was cooled to 80-90 degrees centigrade, toluene was added (800 mm) and the slurry was neutralized with aq.$NH_4OH$ to pH 7.5-8.0. The flask was cooled slowly to 0 degrees centigrade to complete precipitation and the solid was filtered and washed with water until free of bromides.

The off-white product was dried in an oven to a constant weight. An average yield of 80% was obtained.

In addition to the fact that TBDPE is a very efficient flame retardant, due to its aliphatic bromine compared with the Deca which contains an aromatic bromine, the flame retardant according to the present invention is characterized by its outstanding stability against Ultraviolet radiation, while this a well known disadvantage of Deca.

The improved flame retardant property was also noticed in respect to polypropylene as appears from the results summarized in the following Table 3.

TABLE 3

Comparison between flame retardant properties of TBDPE and its diacetate ester with 100 parts of polypropylene (in parts by weight).

| Compositions | Experiment Number | | | | | | |
|---|---|---|---|---|---|---|---|
| | 1 | 2 | 3 | 4 | 5 | 6 | 7 |
| Polypropylene | 100 | 100 | 100 | 100 | 100 | 100 | 100 |
| TBDPE | — | 2.45 | 2.96 | 3.47 | — | — | — |
| Diacetate ester | — | — | — | — | 2.61 | 7.97 | 17.74 |
| Antimony Oxide (AO) | — | 0.51 | 0.62 | 0.73 | 0.72 | 2.2 | 4.91 |
| % by wt. of | | | | | | | |
| Bromine content | 0 | 1.5 | 1.8 | 2.1 | 2.1 | 6 | 12 |
| Ratio Br/Sb | — | 3 | 3 | 3 | 3 | 3 | 3 |
| Flame retardant property | V-B | V-2 | V-2 | V-2 | NR | V-2 | V-2 |

From the above Table is clearly appears the improved property of flame retardancy of TBDPE; even with a small amount of the agent which corresponds to 1.5% by weight bromine, a V-2 resulted while even with higher amount of bromine (2.1%) the ester is NR. This is quite unexpected, considering the fact that the two agents possess an aliphatic bromine. In addition to that, the flame retardant according to the present invention has the advantage of being a free-flowing powder.

The superior thermal aging behaviour imparted by the TBDPE to polypropylene, is illustrated in Table 4. For comparison purposes, the results obtained with other flame retardant agents are also presented. The compositions tested contained 1% of a masterbatch consisting of low density polyethylene + carbon black.

TABLE 4

Thermal aging of polypropylene with various flame retardant reagents.

| Components Flame Retardant (FR) | % by weight | | | | Thermal aging at 120° C. |
|---|---|---|---|---|---|
| | Polypropylene* | AO** | Flame retardant | % Bromine | |
| No FR | 96.14 | 2.86 | — | 0 | Cracks on the surface of a specimen on the 7th day |
| BN-451*** | 85.67 | 4.44 | 8.89 | 4 | Specimen became extremely brittle on the 5th day |
| Nonnen-52**** | 89.91 | 3.03 | 6.06 | 4 | Specimen became extremely brittle on the 4th day |
| TBDPE | 89.32 | 3.23 | 6.45 | 4 | No visible change for 8 days |

*Polypropylene produced by Amoco.
**Antimony oxide, produced by Anzon (Trademark Timonox White Star).
***BN-451 = Ethylene bis-dibromo-norbornane dicarboxiimide.
**** Nonen-52 = 2,3-bis (dibromopropyloxy-3,5 dibromophenyl) sulfone.

As appears from the results given in the above Table 4, the thermal aging of TBDPE is superior to BN-451 and Nonnen-52 both known as flame retardants for polypropylene.

Another important property for flame retardant polymer is the thermal stability. This property is imparted to a certain extent by the flame retardant agent. It was unexpectedly found that TBDPE possesses indeed improved thermal stability. The outstanding thermal stability of TBDPE is illustrated in a clear manner from the attached FIG. 1, wherein the graph of the thermal gravimetric analyses for TBDPE is presented along with some bromine-containing compounds related to TBDPE. It clearly appears from the weight loss percentage, versus the temperature, that TBDPE is the most stable: at 300 degrees C. its decomposition was only 15% whereas the other reagents were completely decomposed much before this temperature.

The flame retardant agent according to the present invention was also found to possess a particular advantageous property of non blooming in the polymer compositions. As known, blooming is considered a serious drawback which appears with additives for plastics, as a result of their poor solubility in the polymer. In Table 5 are presented the results of blooming tests carried out on polypropylene with TBDPE and for comparison with other three well known flame retardants: BN-451, Nonnen-52 and FR-930. The formulations tested were based on polypropylene (produced by Amoco) the flame retardant level in all formulations corresponding to 4% bromine, all formulations resulting in UL-94 V-2 rates.

TABLE 5

Blooming tests carried out at 90 degrees C. for 1000 hours (visual change and finger nail test).

| Components | Formulations* | | | |
|---|---|---|---|---|
| | 1 | 2 | 3 | 4 |
| | (in parts by weight) | | | |
| Polypropylene | 89.32 | 89.91 | 85.67 | 91.5 |
| Antimony oxide* | 3.23 | 3.03 | 4.44 | 2.8 |
| TBDPE | 6.45 | — | — | — |
| BN-451 | — | — | 8.89 | — |

TABLE 5-continued

Blooming tests carried out at 90 degrees C. for 1000 hours (visual change and finger nail test).

| Components | Formulations* | | | |
|---|---|---|---|---|
| | 1 | 2 | 3 | 4 |
| | (in parts by weight) | | | |
| Nonnen - 52 | — | 6.06 | — | — |
| FR-930*** | — | — | — | 5.5 |
| Blooming | No changes compared with virgin polypropylene. | Slight embrittlement; slight blooming on finger nail test. | Slight blooming on finger nail; embrittlement and cracks. | Heavy blooming. |

*1 part of a masterbatch of polyethylene and carbon black was incorporated in all the formulations.
**Antimony oxide produced by ANZON (Trade Mark Timonox White Star).
***FR-930 = Tris (dibromopropyl) isocyanurate produced by AKZO.

The TBDPE agent according to the present invention was found to impart outstanding flame retardant property to ABS resin. In the following Table 6 are presented the results obtained with two levels of the agent: 15 parts and 24.7 parts (per 100 parts resin). For comparison purposes are given also results without the flame retardant agent.

TABLE 6

Flame retardant property imparted to ABS* Compositions (in parts by weight)

| ABS | 100 | 100 | 100 |
|---|---|---|---|
| TBDPE | — | 15 | 24.7 |
| AO | — | 3 | 5.2 |
| Br % | — | 8 | 12 |
| UL94 (3.2 mm) | NR | V-O | V-O |
| (Burning time, sec) | — | 14 | 0 |

*(Novodur PH-AT, melt flow index 830, produced by Bayer).

As appears from the above Table, using 24.7 parts of TBDPE (which corresponds to 12% bromine) will result zero burning time.

The amount of TBDPE agent found to impart flame retardancy to the flammable polymer, is in the range of 1 to 40 parts by weight of the polymer and most preferably in the range of 4 to 25 parts by weight of the polymer.

Although the flame retardant polymer compositions according to the present invention are fairly efficient, one may still enhance their effectiveness by including one or more synergistic compounds as known in the art, such as known metal compounds synergists conventionally used with flame retardants. These synergist compounds include oxides, sulfides or organic acid salts of antimony, arsenic or bismuth. The preferred synergist compound for use in the compositions of the present invention is antimony oxide.

The amount of the TBDPE reagent and antimony oxide to be incorporated in the polymer compositions, in order to impart the required result, may be selected in a broad range depending on the particular polymer and the desired flame retardancy property to be imparted to the polymer composition. Generally, the ratio between the flame retardant and antimony oxide is in the range of between 1 to 10 parts by weight and preferably between 2 to 5 parts by weight.

While the invention covering the use of the TBDPE as flame retardant additive has been described with specific embodiments thereof, it will be understood that it is capable of further modifications and this invention is intended to cover any variation, uses or adaptations of the invention and including such departures from the present disclosure.

We claim:

1. Flame retardant polymer compositions comprising a readily flammable polymer selected from the group consisting of polyolefin, polyamide and styrenic resins or mixtures thereof and an amount of between 1% to 40% by weight of tetrabromodipentaerythritol as flame retardant agent.

2. Flame retardant polymer compositions according to claim 1, wherein the amount of flame retardant agent is in the range of between 4% to 25% by weight of the composition.

3. Flame retardant polymer compositions according to claim 1, wherein one or more synergistic compounds selected from the group consisting of metal oxides, sulfides and organic acids salts of antimony, arsenic or bismuth are incorporated.

4. Flame retardant polymer compositions according to claim 3, wherein said synergistic compound is antimony oxide.

5. Flame retardant polymer compositions according to claim 4, wherein the ratio between the flame retardant and antimony oxide is between 2 to 5 parts by weight.

6. Flame retardant polymer compositions according to claim 1, wherein said polymer is polypropylene.

7. Flame retardant polymer compositions according to claim 1, wherein said polymer is high impact polystyrene.

8. Flame retardant polymer compositions according to claim 1, wherein said polymer is acrylonitrile-butadiene-styrene.

* * * * *